United States Patent
Li et al.

(10) Patent No.: US 12,280,809 B1
(45) Date of Patent: Apr. 22, 2025

(54) HUMAN-MACHINE SHARED CONTROL BASED ON TRAJECTORY PREDICTION

(71) Applicant: Guangdong University of Technology, Guangzhou (CN)

(72) Inventors: Panshuo Li, Guangzhou (CN); Kunsong Lin, Guangzhou (CN); Xinduan Yang, Guangzhou (CN); Hongyi Li, Guangzhou (CN); Renquan Lu, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/660,261

(22) Filed: May 10, 2024

(30) Foreign Application Priority Data

Dec. 18, 2023 (CN) .......................... 202311750441.9

(51) Int. Cl.
*B60W 60/00* (2020.01)
*B60W 40/10* (2012.01)
*B60W 50/00* (2006.01)

(52) U.S. Cl.
CPC ........ *B60W 60/0027* (2020.02); *B60W 40/10* (2013.01); *B60W 50/0097* (2013.01); *B60W 2050/0031* (2013.01); *B60W 2520/06* (2013.01)

(58) Field of Classification Search
None
See application file for complete search history.

(56) References Cited

U.S. PATENT DOCUMENTS

| | | | | |
|---|---|---|---|---|
| 10,627,812 | B2* | 4/2020 | Eggert | G05D 1/0088 |
| 10,759,439 | B2* | 9/2020 | Lee | G06V 20/58 |
| 11,834,077 | B2* | 12/2023 | Sadeghi | B60W 30/095 |
| 11,932,306 | B2* | 3/2024 | Febbo | G06F 18/2415 |
| 2017/0132334 | A1* | 5/2017 | Levinson | B60W 50/00 |
| 2019/0369637 | A1* | 12/2019 | Shalev-Shwartz | G06V 20/56 |

(Continued)

FOREIGN PATENT DOCUMENTS

| | | |
|---|---|---|
| CN | 107804315 A | 3/2018 |
| CN | 113320542 A | 8/2021 |

(Continued)

OTHER PUBLICATIONS

The first office action with search report of CN patent application No. 202311750441.9 issued on Mar. 23, 2024.

*Primary Examiner* — Jonathan M Dager
(74) *Attorney, Agent, or Firm* — Andrew C. Cheng (57) ABSTRACT

The present invention relates to the field of intelligent vehicles, and more specifically, to a human-machine shared control method based on trajectory prediction. It comprises: establishing a road-vehicle model based on vehicle-related parameters and then designing a path-tracking controller; further predicting the driver's driving trajectory, evaluating the driving risk, and switching the control power between the automatic system and the human driver based on the driving risk. The present invention ensures that when the driver's inputs will cause high risk to the vehicle, the driver's input is deprived of; and that when the driver's driving inputs will not cause high risk to the vehicle, the driving is carried out by the driver, so that in the case where the automatic system is having a problem, the driver can effectively realize a safe intervention, and the safety of the intelligent driving is improved.

7 Claims, 4 Drawing Sheets

(56) References Cited

U.S. PATENT DOCUMENTS

| | | | |
|---|---|---|---|
| 2020/0089245 A1* | 3/2020 | Yadmellat | B60W 30/18163 |
| 2020/0174481 A1* | 6/2020 | Van Heukelom | G01C 21/3407 |
| 2020/0353926 A1 | 11/2020 | Zheng | |
| 2021/0139048 A1* | 5/2021 | Russell | B60W 50/0097 |
| 2021/0253128 A1* | 8/2021 | Nister | G05D 1/646 |
| 2022/0035375 A1* | 2/2022 | Rezaee | G06N 3/08 |
| 2022/0169247 A1 | 6/2022 | Borrello | |
| 2022/0169278 A1* | 6/2022 | Refaat | G06F 18/214 |
| 2022/0227391 A1* | 7/2022 | Wang | B60W 40/04 |
| 2022/0242413 A1* | 8/2022 | Jing | B60W 10/10 |
| 2023/0021615 A1* | 1/2023 | Inaba | B60T 7/22 |
| 2023/0084578 A1* | 3/2023 | Sadeghi | B60W 60/0011 |
| | | | 701/23 |
| 2023/0110713 A1* | 4/2023 | Degirmenci | G06N 3/0442 |
| | | | 701/24 |
| 2023/0182775 A1* | 6/2023 | Beaurepaire | B60W 50/14 |
| | | | 701/26 |
| 2023/0192127 A1* | 6/2023 | Funke | B60W 30/025 |
| | | | 701/25 |
| 2024/0001955 A1* | 1/2024 | Etesami | B60W 30/16 |
| 2024/0092390 A1* | 3/2024 | Philion | G06N 3/006 |
| 2024/0132107 A1* | 4/2024 | Cho | B60W 30/0956 |
| 2024/0190458 A1* | 6/2024 | Aguilar Marsillach | |
| | | | B60W 60/001 |
| 2024/0253621 A1* | 8/2024 | Duan | B60W 60/0015 |
| 2024/0351615 A1* | 10/2024 | Song | B60W 50/0097 |

FOREIGN PATENT DOCUMENTS

| | | |
|---|---|---|
| CN | 113460088 A | 10/2021 |
| CN | 114291109 A | 4/2022 |
| CN | 114379583 A | 4/2022 |

* cited by examiner

HUMAN-MACHINE SHARED CONTROL BASED ON TRAJECTORY PREDICTION

PRIOR ART

The prior art discloses an intervention-based shared control method and device for forward collision avoidance scenarios of an autonomous driving vehicle. This invention proposes a vehicle model decoupling method for solving the controller and predicting the risk in a high-speed forward collision avoidance scenario. The acquired vehicle state information is input into a forward collision avoidance control model to obtain the optimal nominal collision avoidance trajectory of the self-driving vehicle, and the acquired steering input data of the driver is used to establish the shared control method under a forward collision avoidance scenario of an autonomous driving vehicle. However, the method will determine the driver's intervention or not only by whether the vehicle's risk of forward collision is large, and when the vehicle's risk of forward collision is already large enough, the system deprives the control of the driver and completely relies on autonomous driving to follow the optimal nominal collision avoidance trajectory, without judging the safety of the driver's own driving behavior. So the proposed shared control method fails to consider the driver's own driving behavior fully, and the system will not be able to evaluate the driving risk from the driver's own driving behavior. When the vehicle's risk is relatively high and the autopilot encounters problems, the driver is unable to intervene, resulting in a significant safety risk.

BACKGROUND OF THE INVENTION

Human-machine co-driving (or shared control) refers to the sharing of vehicle control between drivers and intelligent systems to complete the driving tasks through deep cooperation in perception, decision-making and control. Intelligent systems have the advantages of agile perception, rule-based decision, and precise control, while drivers have better multi-source information fusion, reasoning learning, and manipulating adaptation. Human-machine co-driving can give full play to the respective strengths of the driver and the intelligent system to realize the human-machine integrated driving process. However, when the driver and the intelligent system control the vehicle together, the intelligent system is not limited to a simple interaction mode to remind or assist drivers, and its performance is directly related to the degree of intelligence of the system. When the intelligent system is in line with the driver's maneuvering style and habits, the system will play a good auxiliary effect, but when contrary to the driver's behavioral pattern, it will increase the driver's driving load, and even lead to a serious vehicle accident. In order to solve the human-machine conflict problem caused by the introduction of intelligent driver assistance systems and to improve driving safety, researchers have successively used switching control, model predictive control, fuzzy control, game theory and elliptic safety field in the design of indirect shared steering control strategies. However, as the core of shared steering control of intelligent vehicles, the weight distribution strategy of the current research is mostly based on the influence of the current state of the vehicle on the control weight, and lacks the prediction and comprehensive analysis of the factors influencing the control to drive. In addition, the driver, as an important participant of human-machine shared control, is still insufficiently considered about the influence of the driver's driving behavior on the allocation of control weights. Thus when the automatic system fails, the driver's behavior is unable to change the situation of the vehicle, which causes a serious safety hazard.

SUMMARY OF THE INVENTION

The present invention designed a path tracking controller to predict the trajectory of the driver, and then evaluate the driving risk of the human driver based on the predictive path. Ultimately, the shared control system will determine the distribution strategy of the control weight between the human driver and the automatic system according to the driving risk of the driver. The present invention ensures that when the driver's control input will cause a higher risk to the vehicle, the human-machine shared control system will translate the control weight from the human driver to the automatic system, and that in the case where the driver's Driving inputs do not pose a high risk to the vehicle, driving is carried out by the driver, making it possible for the driver to effectively realize safe interventions in the event of a problem with the automatic driving, and improving the safety of intelligent driving.

DETAILED DESCRIPTION OF THE INVENTION

An object of the present invention is to disclose a trajectory-prediction-based shared control method for human-machine co-driving, which is more secure.

In order to realize the above purpose, the present invention provides a human-machine shared control method based on trajectory prediction, comprising:

S1: Establish the road-vehicle model according to the kinematic and dynamic characteristics of the vehicle;

S2: Design the path tracking controller based on the road-vehicle model;

S3: Trajectory prediction based on the path tracking controller;

S4: Risk assessment of the predicted trajectory;

S5: The switching of control between the automatic system and the driver is realized according to the driving risk.

Further, in step S1, the vehicle-related parameters include intrinsic parameters as well as implementation parameters;

Where the vehicle's intrinsic parameters include: vehicle mass m, longitudinal velocity $v_y$, sampling time T, rotational inertia $I_z$, distance from center of mass to front axle $l_f$, distance from center of mass to rear axle $l_r$, cornering stiffness of front wheels $c_f$, cornering stiffness of rear wheels $c_r$, position coordinates of static obstacles $(X_{ob}, Y_{ob})$, minimum steering angle of the vehicle $\delta_{min}$, maximum steering angle of the vehicle $\delta_{max}$, minimum steering increment of the vehicle $\Delta\delta_{min}$, maximum steering increment of the vehicle $\Delta\delta_{max}$, the shortest distance coefficient between the vehicle and an obstacle Z, safety distance threshold coefficient between the vehicle and an obstacle $G_0$;

Implementation parameters include: position coordinates of the vehicle (X,Y), lateral velocity $v_y$, heading angle $\phi$ and yaw rate r.

In step S2, establishing the road-vehicle model based on the vehicle-related parameters: first establishing a vehicle dynamics model and a vehicle kinematics model based on the vehicle-related parameters, and then establishing the road-vehicle model based on the two vehicle models obtained.

The vehicle-related parameters for modeling the vehicle dynamics characteristics comprise: letting the longitudinal velocity of the vehicle $v_x$ be independently controlled and constant, and the lateral force of the vehicle can be expressed as:

$$F_{xf}\cos\delta - F_{xf}\sin\delta + F_{yr} = m(\dot{v}_y + v_x r)$$

Where $\delta$ is the front wheel steering angle of the vehicle, $v_x$ and $v_y$ are the longitudinal and lateral velocities at the center of mass of the vehicle, r is the yaw rate of the vehicle, $F_{yr}$ and $F_{xr}$ are the lateral and longitudinal forces on the rear wheels of the vehicle, and $F_{xf}$ as well as $F_{xf}$ are the lateral and longitudinal forces on the front wheels of the vehicle;

Assuming that the vehicle is moving only in a two-dimensional plane without lateral slip and the vehicle's tire force satisfy a linear model, so the moment equations of the vehicle, the front and rear wheel slip angle ($\alpha_f$ and $\alpha_r$), and the tire forces on the front and rear wheels ($F_{yf}$ and $F_{yr}$) can be expressed as follows, respectively:

$$l_f(F_{yf}\cos\delta) - l_r(F_{yr} - F_{xf}\sin\delta) = I_z \dot{r}$$

$$\alpha_f = \tan^{-1}\left(\frac{v_y + l_f r}{v_x}\right) - \delta$$

$$\alpha_r = \tan^{-1}\left(\frac{v_y + l_r r}{v_x}\right)$$

$$F_{yf} = -c_f \alpha_f$$

$$F_{yr} = -c_r \alpha_r$$

Where $l_f$ and $l_r$ are the distances from the center of mass to the centers of the front and rear wheels, $I_z$ is the moment of the vehicle's inertia around the z axis, and $c_f$ as well as $c_r$ are the cornering stiffnesses of the front and rear wheels, respectively;

Therefore, the vehicle dynamics model can be obtained as follows:

$$\dot{v}_y = \frac{-c_f\left[\tan^{-1}\left(\frac{v_y + l_f r}{v_x}\right) - \delta\right]\cos\delta - c_r\tan^{-1}\left(\frac{v_y - l_r r}{v_x}\right)}{m} - v_x r$$

$$\dot{r} = \frac{-l_f c_f\left[\tan^{-1}\left(\frac{v_y + l_f r}{v_x}\right) - \delta\right]\cos\delta + l_r c_r \tan^{-1}\left(\frac{v_y - l_r r}{v_x}\right)}{I_z}$$

Using a small angle approximation of the trigonometric functions, the linearized model is obtained:

$$\dot{v}_y = \frac{-(c_f + c_r)}{m v_x}v_y + \left[\frac{l_r c_r - l_f c_f}{m v_x} - v_x\right]r + \frac{c_f}{m}\delta$$

$$\dot{r} = \frac{l_r c_r - l_f c_f}{I_z v_x}v_y + \frac{-(l_f^2 c_f + l_r^2 c_r)}{I_z v_x}r + \frac{l_f c_f}{m}\delta$$

This two-wheeled model is transformed into a four-wheeled vehicle model, so the vehicle model can be represented as:

$$\begin{bmatrix} \dot{v}_y \\ \dot{r} \end{bmatrix} = \begin{bmatrix} \frac{-2(c_f + c_r)}{m v_x} & \frac{2(l_r c_r - l_f c_f)}{m v_x} - v_x \\ \frac{2(l_r c_r - l_f c_f)}{I_z v_x} & \frac{-2(l_1^2 c_f + l_r^2 c_r)}{I_z v_x} \end{bmatrix}\begin{bmatrix} v_y \\ r \end{bmatrix} + \begin{bmatrix} \frac{2c_f}{m} \\ \frac{2l_f c_f}{m} \end{bmatrix}\delta$$

In addition, when the vehicle performs path tracking, the lateral error $e_d$ and heading error $e_\phi$ can be expressed by the following equation:

$$\dot{e}_d = v_x \sin(e_\phi) + v_y \cos(e_\phi)$$

$$\dot{e}_\phi = r - v_x \rho$$

Where $e_d$ is the lateral error between the center of the vehicle's mass and the reference trajectory, and $e_\phi$ is the heading error between the vehicle and the reference trajectory. In addition, a small angle assumption (i.e., $\sin(e_\phi) \approx e_\phi$, $\cos(e_\phi) \approx 1$) is used for the heading error $e_\phi$, so the tracking error can be simplified as:

$$\dot{e}_d = v_x e_\phi + v_y$$

$$\dot{e}_\phi = r - v_x \rho$$

In summary, the dynamics model of the vehicle can be expressed as:

$$\begin{bmatrix} \dot{v}_y \\ \dot{r} \\ \dot{e}_d \\ \dot{e}_\phi \end{bmatrix} =$$

$$\begin{bmatrix} \frac{-2(c_f + c_r)}{m v_x} & \frac{2(l_r c_r - l_f c_f)}{m v_x} - v_x & 0 & 0 \\ \frac{2(l_r c_r - l_f c_f)}{I_z v_x} & \frac{-2(l_f^2 c_f + l_r^2 c_r)}{I_z v_x} & 0 & 0 \\ 1 & 0 & 0 & v_x \\ 0 & 1 & 0 & 0 \end{bmatrix}\begin{bmatrix} v_y \\ r \\ e_d \\ e_\phi \end{bmatrix} + \begin{bmatrix} \frac{2c_f}{m} \\ \frac{2l_f c_f}{m} \\ 0 \\ 0 \end{bmatrix}\delta + \begin{bmatrix} 0 \\ 0 \\ 0 \\ -v_x \end{bmatrix}\rho$$

Further, according to the kinematic characteristics of the vehicle, the kinematic model of the vehicle can be described as follows:

$$\dot{X} = v_x \cos\phi - v_y \sin\phi$$

$$\dot{Y} = v_x \sin\phi + v_y \cos\phi$$

Again, assuming that the vehicle is in a driving condition with a small steering angle, the model is simplified as:

$$\dot{X} = v_x - v_y \phi$$

$$\dot{Y} = v_x \phi + v_y$$

Further, building a road-vehicle model based on the vehicle dynamics model and the vehicle kinematics model:

$$\dot{x}(t) = Ax(t) + Bu(t) + B_{107}\omega(t)$$

Where $$x(t) = [v_y, r, \phi, e_d, e_\phi, X, Y]^T,$$

$$u(t) = \delta(t),$$

$$\omega(t) = [\rho, v_x]^T$$

$$A = \begin{bmatrix} \frac{-2(C_f + C_r)}{mv_x} & \frac{2(l_r C_r - l_f C_f)}{mv_x} & 0 & 0 & 0 & 0 & 0 \\ \frac{2(l_r C_r - l_f C_f)}{I_z v_x} & \frac{-2(l_f^2 C_f + l_r^2 C_r)}{I_z v_x} & 0 & 0 & 0 & 0 & 0 \\ 0 & 1 & 0 & 0 & 0 & 0 & 0 \\ 1 & 0 & 0 & 0 & v_x & 0 & 0 \\ 0 & 1 & 0 & 0 & 0 & 0 & 0 \\ -\phi & 0 & 0 & 0 & 0 & 0 & 0 \\ 1 & 0 & v_x & 0 & 0 & 0 & 0 \end{bmatrix},$$

$$B = \begin{bmatrix} \frac{2c_f}{m} \\ \frac{2l_f c_f}{m} \\ 0 \\ 0 \\ 0 \\ 0 \\ 0 \end{bmatrix},$$

$$B_\omega = \begin{bmatrix} 0 & 0 \\ 0 & 0 \\ 0 & 0 \\ 0 & 0 \\ v_x & 0 \\ 0 & 1 \\ 0 & 0 \end{bmatrix}$$

For computer simulation, T is used as the sampling time and Euler's method is utilized:

$$\dot{x}(t) = \frac{x(k+1) - x(k)}{T}$$

Converting a continuous vehicle model into a discrete vehicle model:

$$\xi(k+1) = \tilde{A}\xi(k) + \tilde{B}u(k) + \tilde{B}_\omega \omega(k)$$

Where $\overline{A} = AT + I$, $\overline{B} = BT$, $\overline{B}_\omega = B_\omega T$, I denotes the unit matrix with corresponding dimensions.

Further, in step S2, designing the path-tracking controller according to the road-vehicle model: the prediction step of the path-tracking controller is $N_p$, the control step is $N_c$, and the system states at each moment of time x(t) will be used as the starting point of the prediction sequence x(0|t) for the optimization computation, and the optimal control sequence $u^*(k|t)$, $k \in [0, N_p-1]$ and sequences of states $x^*(k|t)$, $k \in [1, N_p]$ will be obtained within the prediction time domain $[t, t+N_p]$ and the first value of the optimal control sequence (i.e., $u^*(0|t)$) will be used as a control input at the current moment of time to act on the vehicle;

Due to the dynamic change of the vehicle state, it is necessary to calculate the optimal steering angle according to the current actual vehicle condition while avoiding frequent steering angle changes. Therefore, the path tracking controller based on the model predictive control method is designed with the objective function:

$$\min J(x(k), u(k), \omega(k)) = \min(Y^T Q Y + \Delta U^T R \Delta U)$$

$$s.t. \ \xi(k+1) = \tilde{A}\xi(k) + \tilde{B}u(k) + \tilde{B}_\omega \omega(k)$$

Where $\xi(k+1) = \tilde{A}\xi(k) + \tilde{B}u(k) + \tilde{B}_\omega \omega(k)$ is the road-vehicle model, and $Y = [y(k+1), y(k+2), \ldots, y(k+N_p)]^T$ the predicted output of the system; Q denotes the output weight matrix, and $\Delta U = [\Delta u(k), \Delta u(k+1), \ldots, \Delta u(k+N_c-1)]^T$ the control increment sequence; R denotes the control weight matrix, and in addition for achieving the goal of path tracking, the output equation is taken as $$y = \begin{bmatrix} e_d \\ e_\phi \end{bmatrix};$$

Considering the control limit constraints and the control increment constraints in the control process:

$$u_{min}(t+k) \leq u(t+k) \leq u_{max}(t+k)$$

$$\Delta u_{min}(t+k) \leq \Delta u(t+k) \leq \Delta u_{max}(t+k)$$

$$k = 0, 1, \ldots, N_c - 1$$

Further, in step S3, the driver's driving trajectory is predicted according to the path tracking controller:

$$\min J(x(k), u(k), \omega(k)) = \min(Y^T Q Y + \Delta U^T R \Delta U)$$

$$s.t. \ \xi(k+1) = \tilde{A}\xi(k) + \tilde{B}u(k) + \tilde{B}_\omega \omega(k) \quad \text{Objective function:}$$

$$u_{min}(t+k) \leq u(t+k) \leq u_{max}(t+k)$$

$$\Delta u_{min}(t+k) \leq \Delta u(t+k) \leq \Delta u_{max}(t+k)$$

$$k = 0, 1, \ldots, N_c - 1 \quad \text{Constraints:}$$

By solving this quadratic programming problem, the optimal control sequence to achieve target tracking can be obtained:

$$U = [u(k), u(k+1), \ldots, u(k+N_c-1)]$$

The predicted sequence of system states $\Xi$ is also worked out by utilizing both the state equations of the system and the obtained optimal control sequence:

$$\Xi = \Gamma x(k) + \gamma U + \Pi \Omega$$

Where $$\Xi = \begin{bmatrix} x(k+1) \\ x(k+2) \\ \vdots \\ x(k+N_c) \end{bmatrix},$$

$$U = \begin{bmatrix} u(k) \\ u(k+1) \\ \vdots \\ u(k+N_c-1) \end{bmatrix},$$

$$\Omega = \begin{bmatrix} \omega(k) \\ \omega(k+1) \\ \vdots \\ \omega(k+N_c-1) \end{bmatrix},$$

$$\Gamma = \begin{bmatrix} \tilde{A} \\ \tilde{A}^2 \\ \vdots \\ \tilde{A}^{N_c} \end{bmatrix},$$

$$\Upsilon = \begin{bmatrix} \tilde{B} & 0 & \ldots & 0 \\ \tilde{A}\tilde{B} & \tilde{B} & \ldots & 0 \\ \vdots & \vdots & \ddots & \vdots \\ \tilde{A}^{(N_c-1)}\tilde{B} & \tilde{A}^{(N_c-2)}\tilde{B} & \ldots & \tilde{B} \end{bmatrix},$$

-continued $$\prod = \begin{bmatrix} \tilde{B} & 0 & \cdots & 0 \\ \tilde{A}\tilde{B}_\omega & \tilde{B}_\omega & \cdots & 0 \\ \vdots & \vdots & \ddots & \vdots \\ \tilde{A}^{(N_c-1)}\tilde{B}_\omega & \tilde{A}^{(N_c-2)}\tilde{B}_\omega & \cdots & \tilde{B}_\omega \end{bmatrix}$$

The predictive trajectory sequence of driver is:

$[(X_{k+1},Y_{k+1}),(X_{k+2},Y_{k+2}), \ldots ,(X_{k+N},Y_{k+N_c})]$

Further, in step S4, the driving risk based on the predicted trajectory could be evaluated by the following way:

The driving risk based on the positional relationship between the driver and the obstacle will be evaluated by employing an artificial potential field approach;

First, define the field strength of the repulsive field:

$$U_R(X) = \begin{cases} 0.5Z\left(\dfrac{1}{R_R} - \dfrac{1}{G_0}\right)^2, & R_R \le G_0 \\ 0, & R_R > G_0 \end{cases}$$

Where (X,Y) denotes the current position of the vehicle and $(X_{OB}, Y_{OB})$ denotes the position of the obstacle; Z denotes the shortest distance coefficient between the vehicle and an obstacle, $G_0$ is used to characterize the safety distance threshold coefficient for an obstacle, and $R_R$ Indicates the actual shortest distance between the vehicle and an obstacle $R_R = \sqrt{(X-X_{OB})^2 + (Y-Y_{OB})^2}$.

Thus, the field force of the repulsive field $F_R$ formed around the obstacle can be described by a negative gradient in the field strength $$U_R(X):F_R = -grad[U_R(X)] = \begin{cases} Z\left(\dfrac{1}{R_R} - \dfrac{1}{G_0}\right) \times \dfrac{1}{R_R^2}, & R_R \le G_0 \\ 0, & R_R > G_0 \end{cases}$$

While the field force of the repulsive field can be categorized into longitudinal field force $F_{Rx}$ and lateral field force $F_{Ry}$:

$$\begin{cases} F_{Rx} = F_R \cdot \cos(\phi) \\ F_{Ry} = F_R \cdot \sin(\phi) \end{cases}$$

Where φ denotes the angle formed by the line connecting the vehicle and the obstacle with the x-axis of the global coordinates;

Thus, the predicted trajectory with the control step $N_c$ has a longitudinal risk $R_x$ and a lateral risk $R_y$ described by the average of the risks, and the total driving risk $R_{risk}$ is obtained:

$$\begin{cases} R_x = \dfrac{\sum_{k=1}^{N_c} F_{Rx}(X_{pred}^k, Y_{pred}^k)}{N_c} \\ R_y = \dfrac{\sum_{k=1}^{N_c} F_{Ry}(X_{pred}^k, Y_{pred}^k)}{N_c} \end{cases}$$

$R_{risk} = R_x + R_y$

Further, in step S5, realizing the switching of control between the automatic system and the driver based on the driving risk. The detail can be described as follow: performing a risk assessment of the predicted trajectory in step S4 to obtain a driving risk $R_{risk}$, giving a threshold of the driver's driving risk $R_{risk}$* and switching the control of the vehicle to the automatic system when the driving risk be equal or greater than the risk threshold (i.e. $R_{risk} \ge R_{risk}$*); and switching the control of the vehicle to the human driver when the driving risk be less than the risk threshold (i.e. $R_{risk} < R_{risk}$*).

The beneficial effects of the technical solution from the present invention compared to the prior art are as below:

The present invention designs a path-tracking controller to predict the trajectory, and then predicts the driver's driving risk of the trajectory to determine whether the vehicle is controlled by the driver or by the automatic system. The present invention ensures that when the driver's driving input will cause a higher risk to the vehicle, the shared control module will deprive the driver of his or her driving input, and drive entirely by the automated system, and that when the driver's driving inputs do not pose a high risk to the vehicle, the driving manipulation is carried out by the driver, making it possible for the driver to effectively realize safe interventions in the event of a problem from the automatic system, and improving the safety of intelligent driving.

Application Instances

The drawings are attached to exemplary illustration only and are not to be construed as a limitation of this patent.

The technical solution of the present invention is further described below in connection with the accompanying drawings and embodiments.

Embodiment 1

Figure 1:
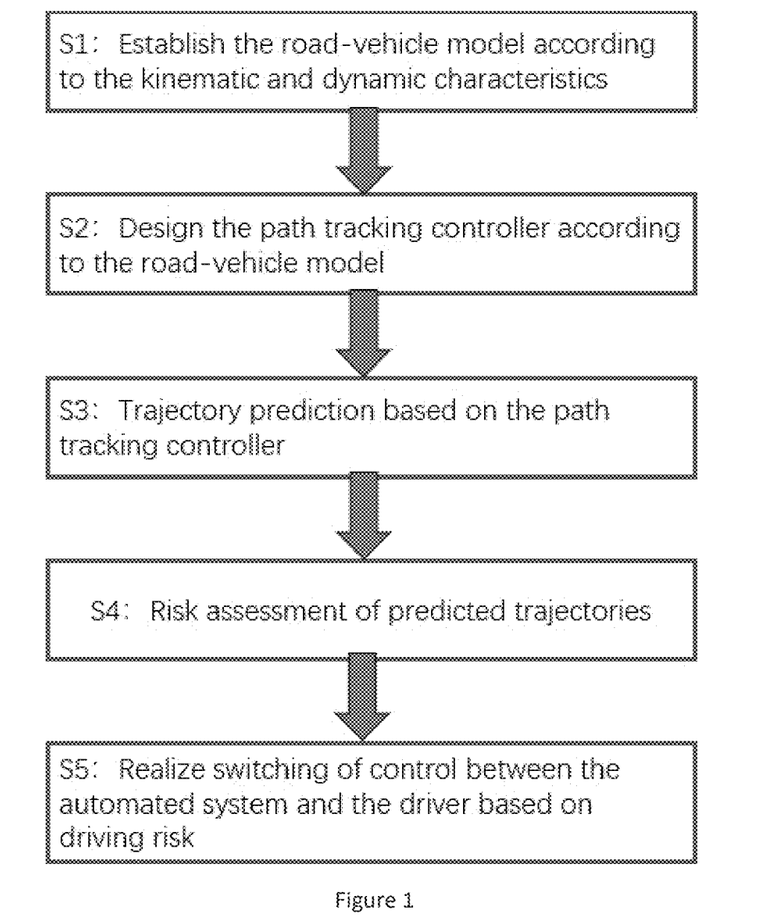
FIG. 1 shows the method for human-machine shared control based on trajectory prediction described in Embodiment 1.
Figure 2:
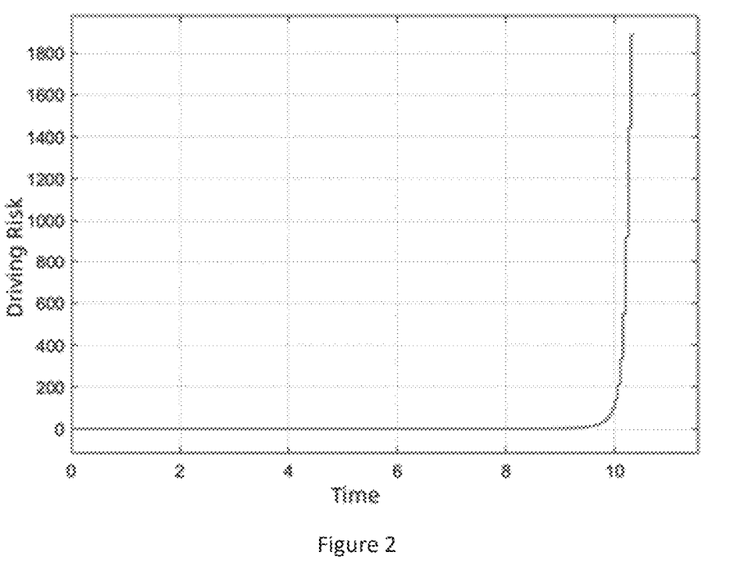
FIG. 2 shows the assessment result of the driver's driving risk described in Embodiment 3.
Figure 3:
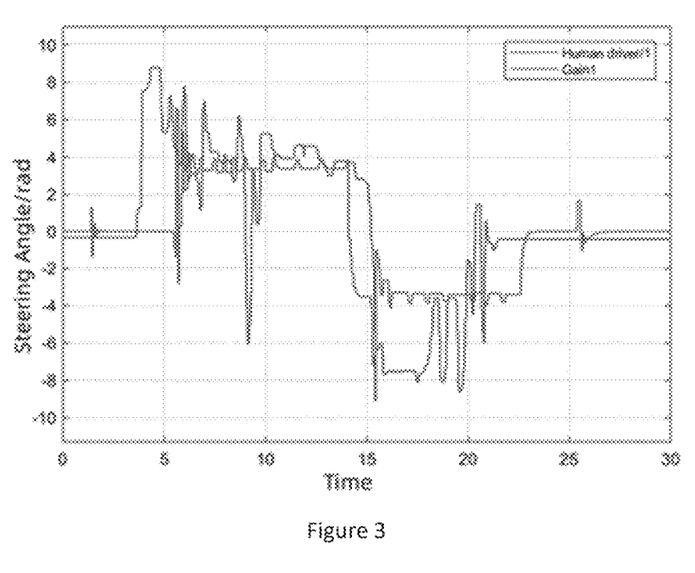
FIG. 3 shows a graph of the steering angle for the driver and automatic system described in Embodiment 3.
Figure 4:
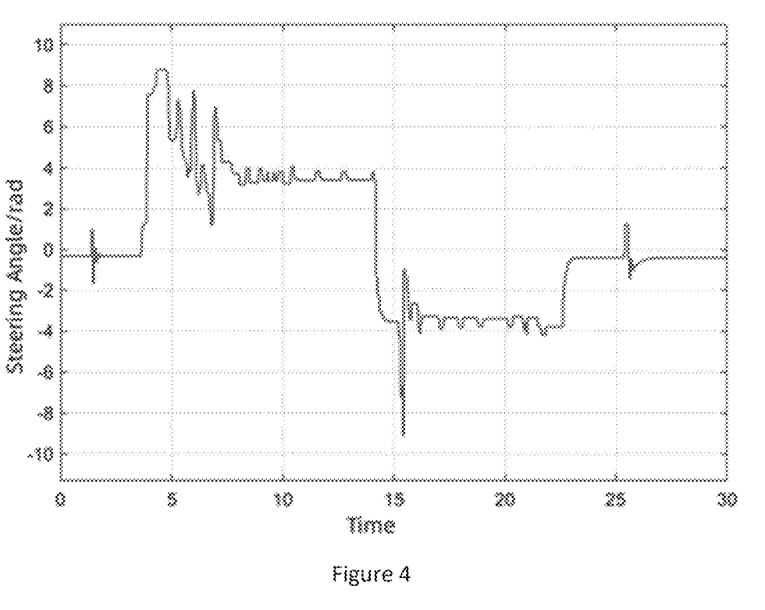
FIG. 4 shows a graph of the steering angle based on the human-machine shared control strategy described in Embodiment 3.

This embodiment discloses, as shown in figure. 1, a human-machine shared control method based on trajectory prediction, comprising the following steps:

S1: Establish the road-vehicle model according to the kinematic and dynamic characteristics;

S2: Design the path tracking controller based on the road-vehicle model;

S3: Trajectory prediction based on the path tracking controller;

S4: Risk assessment of predicted trajectories;

S5: Switching of control between the automatic system and the driver is realized according to the driving risk.

The embodiment predicts the trajectory by designing a path tracking controller, and then determines whether the vehicle is controlled by the driver or by the automatic system by means of predicting the driving risk of the driver. This embodiment ensures that when the driving input from the driver would pose a higher risk to the vehicle, the shared control module will deprive the driver of his or her driving input, and drive entirely by the automatic system. The embodiment also ensures that when the driver's driving inputs do not pose a high risk to the vehicle, the driving manipulation is carried out by the driver, making it possible for the driver to effectively realize safe interventions in the event of a problem from the automatic system, and improving the safety of intelligent driving.

Embodiment 2

This embodiment is further disclosed based on embodiment 1:

In step S1, the vehicle-related parameters include intrinsic parameters as well as implementation parameters;

Where the vehicle's intrinsic parameters include: mass m, longitudinal velocity $v_y$, sampling time T, rotational inertia $I_z$, distance from center of mass to front axle $l_f$, distance from center of mass to rear axle $l_r$, cornering stiffness of front wheels $c_f$, cornering stiffness of rear wheels $c_r$, position coordinates of static obstacles ($X_{ob}$, $Y_{ob}$), minimum steering of the vehicle $\delta_{min}$, maximum steering of the vehicle $\delta_{max}$, minimum steering increment of the vehicle $\Delta\delta_{min}$, maximum steering increment of the vehicle $\Delta\delta_{max}$, parameter of the shortest distance between the vehicle and an obstacle Z, safety distance threshold parameter between the vehicle and an obstacle $G_0$;

Implementation parameters include: position coordinates of the vehicle (X,Y), lateral velocity $v_y$, heading angle $\phi$ and angular velocity r.

Establishing the road-vehicle model according to the vehicle-related parameters in step S2: first establishing a vehicle dynamics model and a vehicle kinematics model based on the vehicle-related parameters, and then establishing the vehicle road-vehicle model according to the vehicle dynamics model and the vehicle kinematics model.

The modeling process of vehicle dynamics based on vehicle-related parameters is as follows: letting the longitudinal speed of the vehicle $v_x$ be independently controlled and constant, and the lateral force of the vehicle can be expressed as:

$$F_{xf}\cos\delta - F_{xf}\sin\delta + F_{yr} = m(\dot{v}_y + v_x r)$$

Where $\delta$ is the front wheel angle of the vehicle, $v_x$ and $v_y$ are the longitudinal and lateral velocities at the center of mass of the vehicle, r is the yaw rate of the vehicle, $F_{yr}$ and $F_r$ are the lateral and longitudinal forces on the rear wheels of the vehicle, and $F_{xf}$ and $F_{xf}$ are the lateral and longitudinal forces on the front wheels of the vehicle;

Assuming that the vehicle is moving only in a two-dimensional plane without lateral slip and the vehicle's tire force is a linear model, the moment equations of the vehicle, the front and rear wheel slip angle ($\alpha_f$ and $\alpha_r$), and the tire forces on the front and rear wheels ($F_{yf}$ and $F_{yr}$) can be expressed as follows, respectively:

$$l_f(F_{yf}\cos\delta) - l_r(F_{yr} - F_{xf}\sin\delta) = I_z \dot{r}$$

$$\alpha_f = \tan^{-1}\left(\frac{v_y + l_f r}{v_x}\right) - \delta$$

$$\alpha_r = \tan^{-1}\left(\frac{v_y - l_r r}{v_x}\right)$$

$$F_{yf} = -c_f \alpha_f$$

$$F_{yr} = -c_r \alpha_r$$

Where $l_f$ and $l_r$ are the distances from the center of mass to the centers of the front and rear wheels, $I_z$ is the moment of the vehicle's inertia around the z axis, and $c_f$ and $c_r$ are the cornering stiffnesses of the front and rear wheels, respectively;

Therefore, the vehicle dynamics model can be obtained as follows:

$$\dot{v}_y = \frac{-c_f\left[\tan^1\left(\frac{v_Y + l_f r}{v_X}\right) - \delta\right]\cos\delta - c_r\tan^1\left(\frac{v_Y - l_r r}{v_X}\right)}{m} - v_x r$$

$$\dot{r} = \frac{-l_f c_f\left[\tan^{-1}\left(\frac{v_y + l_f r}{v_x}\right) - \delta\right]\cos\delta + l_r c_r\tan^{-1}\left(\frac{v_y - l_r r}{v_x}\right)}{I_z}$$

Using the small angle approximation of the trigonometric functions, a linearization is obtained:

$$\dot{v}_y = \frac{-(c_f + c_r)}{mv_x}v_y + \left[\frac{l_r c_r - l_f c_f}{mv_x} - v_x\right]r + \frac{c_f}{m}\delta$$

$$\dot{r} = \frac{l_r c_r - l_f c_f}{I_z v_x}v_y + \frac{-(l_f^2 c_f + l_r^2 c_r)}{I_z v_x}r + \frac{l_f c_f}{m}\delta$$

This two-wheeled model is transformed into a four-wheeled vehicle model, so the vehicle model can be represented as:

$$\begin{bmatrix}\dot{v}_y \\ \dot{r}\end{bmatrix} = \begin{bmatrix}\frac{-2(c_f + c_r)}{mv_x} & \frac{2(l_r c_r - l_f c_1)}{mv_x} - v_x \\ \frac{2(l_r c_r - l_f c_f)}{I_z v_x} & \frac{-2(l_f^2 c_f + l_r^2 c_r)}{I_z v_x}\end{bmatrix}\begin{bmatrix}v_y \\ r\end{bmatrix} + \begin{bmatrix}\frac{2c_f}{m} \\ \frac{2l_f c_f}{m}\end{bmatrix}\delta$$

In addition, when the vehicle performs path tracking the lateral error $e_d$ and heading error $e_\phi$ can be expressed by the following equation:

$$\dot{e}_d = v_x \sin(e_\phi) + v_y \cos(e_\phi)$$

$$\dot{e}_\phi = r - v_x \rho$$

Where, $e_d$ is the lateral error between the center of the vehicle's mass and the reference trajectory, and $e_\phi$ is the heading angle error between the vehicle and the reference trajectory, and a small angle assumption (i.e., $\sin(e_\phi) \approx e_\phi$, $\cos(e_\phi) \approx 1$) is used for the heading error $e_\phi$, so the tracking error can be simplified as:

$$\dot{e}_d = v_x e_\phi + v_y$$

$$\dot{e}_\phi = r - v_x \rho$$

In summary, the dynamics model of the vehicle can be expressed as:

$$\begin{bmatrix}\dot{v}_y \\ \dot{r} \\ \dot{e}_d \\ \dot{e}_\phi\end{bmatrix} = \begin{bmatrix}\frac{-2(c_f + c_r)}{mv_x} & \frac{2(l_r c_r - l_f c_1)}{mv_x} - v_x & 0 & 0 \\ \frac{2(l_r c_r - l_f c_f)}{I_z v_x} & \frac{-2(l_f^2 c_f + l_r^2 c_r)}{I_z v_x} & 0 & 0 \\ 1 & 0 & 0 & v_x \\ 0 & 1 & 0 & 0\end{bmatrix}\begin{bmatrix}v_y \\ r \\ e_d \\ e_\phi\end{bmatrix} + \begin{bmatrix}\frac{2c_f}{m} \\ \frac{2l_f c_f}{m} \\ 0 \\ 0\end{bmatrix}\delta + \begin{bmatrix}0 \\ 0 \\ 0 \\ -v_x\end{bmatrix}\rho$$

Modeling the vehicle's kinematic characteristics based on vehicle-related parameters: according to the kinematic characteristics of the vehicle, the kinematic model of the vehicle can be described as follows:

$$\dot{X}=v_x \cos \phi - v_y \sin \phi$$

$$\dot{Y}=v_x \sin \phi + v_y \cos \phi$$

Assuming again that the vehicle is in a driving condition with a small steering angle, the model is simplified as:

$$\dot{X}=v_x-v_y\phi$$

$$\dot{Y}=v_x\phi+v_y$$

Further, establishing the road-vehicle model based on the vehicle dynamics model and the vehicle kinematics model:

$$\dot{x}(t)=Ax(t)+Bu(t)+B_{107}\omega(t)$$

Where $$x(t) = [v_y, r, \phi, e_d, e_\phi, X, Y]^T, u(t) = \delta(t), \omega(t) = [\rho, v_x]^T$$

$$A = \begin{bmatrix} \frac{-2(C_f + C_r)}{mv_x} & \frac{2(l_rC_r - l_fC_1)}{mv_x} - v_x & 0 & 0 & 0 & 0 & 0 \\ \frac{2(l_rC_r - l_fC_f)}{I_z v_x} & \frac{-2(l_f^2 C_f + l_r^2 C_r)}{I_z v_x} & 0 & 0 & 0 & 0 & 0 \\ 0 & 1 & 0 & 0 & 0 & 0 & 0 \\ 1 & 0 & 0 & 0 & v_x & 0 & 0 \\ 0 & 1 & 0 & 0 & 0 & 0 & 0 \\ \phi & 0 & 0 & 0 & 0 & 0 & 0 \\ 1 & 0 & v_x & 0 & 0 & 0 & 0 \end{bmatrix},$$

$$B = \begin{bmatrix} \frac{2C_f}{m} \\ \frac{2l_f C_f}{m} \\ 0 \\ 0 \\ 0 \\ 0 \\ 0 \end{bmatrix}, B_\omega = \begin{bmatrix} 0 & 0 \\ 0 & 0 \\ 0 & 0 \\ 0 & 0 \\ v_x & 0 \\ 0 & 1 \\ 0 & 0 \end{bmatrix}$$

To discretize the road-vehicle model, T is used as the sampling time and Euler's method is utilized:

$$\dot{x}(t) = \frac{x(k+1) - x(k)}{T}$$

Converting a continuous vehicle model into a discrete vehicle model:

$$\xi(k+1)=\tilde{A}\xi(k)+\tilde{B}u(k)+\tilde{B}_\omega\omega(k)$$

where $\overline{A}=AT+I$, $\overline{B}=BT$, $\overline{B}_\omega=B_\omega T$, I denotes the unit matrix of the corresponding dimensions.

In step S2, designing the path tracking controller according to the road-vehicle model: the prediction step of the path tracking controller is $N_p$, and the control step is $N_c$, the system measurements at each moment x(t) will be used as the starting point of the prediction sequence x(0|t) for the optimization calculation, and the optimal sequence of the controlled variables u*(k|t), k∈[0,$N_p$−1] and the sequence of the states x*(k|t), k∈[0,$N_p$−1] will be obtained within the prediction time domain [t,t+$N_p$] and the first value of the optimal control sequence (i.e., u*(0|t)) will be used as the control input at the current moment to act on the vehicle;

Due to the dynamic change of vehicle states, it is necessary to calculate the optimal steering angle according to the current actual vehicle condition while avoiding frequent steering angle changes. Therefore, the path tracking controller based on the model predictive control method is designed with the objective function:

$$\min J(x(k),u(k),\omega(k))=\min(Y^TQY+\Delta U^TR\Delta U)$$

$$s.t. \xi(k+1)=\tilde{A}\xi(k)+\tilde{B}u(k)+\tilde{B}_\omega\omega(k)$$

Where, $\xi(k+1)=\tilde{A}\xi(k)+\tilde{B}u(k)+\tilde{B}_\omega\omega(k)$ is the road-vehicle model, the predicted output of the system $Y=[y(k+1), y(k+2), \ldots, y(k+N_p)]^T$, Q denotes the output weight matrix, the control increment sequence $\Delta U=[\Delta u(k),\Delta u(k+1),\ldots,\Delta u(k+N_c-1)]^T$, R denotes the control weight matrix, and in addition for achieving the goal of path tracking, the output equation is taken as $$y = \begin{bmatrix} e_d \\ e_\phi \end{bmatrix};$$

Considering the limit constraints and the increment constraints of the controlled variables in the control process:

$$u_{min}(t+k) \leq u(t+k) \leq u_{max}(t+k)$$

$$\Delta u_{min}(t+k) \leq \Delta u(t+k) \leq \Delta u_{max}(t+k)$$

$$k=0,1,\ldots,N_c-1$$

In step S3, the driving trajectory is predicted according to the path tracking controller:

$$\min J(x(k),u(k),\omega(k))=\min(Y^TQY+\Delta U^TR\Delta U)$$

$$s.t. \xi(k+1)=\tilde{A}\xi(k)+\tilde{B}u(k)+\tilde{B}_\omega\omega(k) \qquad \text{Objective function:}$$

$$u_{min}(t+k) \leq u(t+k) \leq u_{max}(t+k)$$

$$\Delta u_{min}(t+k) \leq \Delta u(t+k) \leq \Delta u_{max}(t+k)$$

$$k=0,1,\ldots,N_c-1 \qquad \text{Constraints:}$$

By solving this quadratic programming problem, the optimal control sequence to achieve target tracking can be obtained:

$$U=[u(k),u(k+1),\ldots,u(k+N_c-1)]$$

The predicted sequence of system states $\Xi$ is also computed by utilizing both the state equations of the system and the obtained optimal control sequence:

$$\Xi=\Gamma x(k)+\gamma U+\Pi\Omega$$

Where $$\Xi = \begin{bmatrix} x(k+1) \\ x(k+2) \\ \vdots \\ x(k+N_c) \end{bmatrix}, U = \begin{bmatrix} u(k) \\ u(k+1) \\ \vdots \\ u(k+N_c-1) \end{bmatrix}, \Omega = \begin{bmatrix} \omega(k) \\ \omega(k+1) \\ \vdots \\ \omega(k+N_c-1) \end{bmatrix}, \Gamma = \begin{bmatrix} \tilde{A} \\ \tilde{A}^2 \\ \vdots \\ \tilde{A}^{N_c} \end{bmatrix}.$$

$$\Upsilon = \begin{bmatrix} \tilde{B} & 0 & \ldots & 0 \\ \tilde{A}\tilde{B} & \tilde{B} & \ldots & 0 \\ \vdots & \vdots & \ddots & \vdots \\ \tilde{A}^{(N_c-1)}\tilde{B} & \tilde{A}^{(N_c-2)}\tilde{B} & \ldots & \tilde{B} \end{bmatrix}, \Pi = \begin{bmatrix} \tilde{B}_\omega & 0 & \ldots & 0 \\ \tilde{A}\tilde{B}_\omega & \tilde{B}_\omega & \ldots & 0 \\ \vdots & \vdots & \ddots & \vdots \\ \tilde{A}^{(N_c-1)}\tilde{B}_\omega & \tilde{A}^{(N_c-2)}\tilde{B}_\omega & \ldots & \tilde{B}_\omega \end{bmatrix}$$

The driver prediction sequence is:

$$[(X_{k+1},Y_{k+1}),(X_{k+2},Y_{k+2}),\ldots,(X_{k+N_c},Y_{k+N_c})]$$

In step S4, performing a risk assessment of the predicted trajectory: the driver's driving risk will be evaluated using an artificial potential field approach based on the positional relationship between the driver and the obstacle.

Firstly, define the field strength of the barrier field:

$$U_R(X) = \begin{cases} 0.5Z\left(\dfrac{1}{R_R} - \dfrac{1}{G_0}\right)^2, & R_R \leq G_0 \\ 0, & R_R > G_0 \end{cases}$$

Where (X,Y) denotes the current position coordinates of the vehicle and $(X_{OB}, Y_{OB})$ denotes the position coordinates of the obstacle. Z denotes the shortest distance coefficient between a vehicle and an obstacle, $G_0$ is used to characterize the safety distance threshold for an obstacle; the $R_R$ indicates the shortest distance between a vehicle and an obstacle $R_R = \sqrt{(X-X_{OB})^2 + (Y-Y_{OB})^2}$.

Thus, the field force of the repulsive field $F_R$ formed around the obstacle can be described by a negative gradient in the field strength $U_R(X)$ $$F_R = -grad[U_R(X)]\begin{cases} Z\left(\dfrac{1}{R_R} - \dfrac{1}{G_0}\right) \times \dfrac{1}{R_R^2}, & R_R \leq G_0 \\ 0, & R_R > G_0 \end{cases}$$

At this point, the field force of the repulsive field can be categorized into the longitudinal field force $F_{Rx}$ and the lateral field force $F_{Ry}$:

$$\begin{cases} F_{Rx} = F_R \cdot \cos(\phi) \\ F_{Ry} = F_R \cdot \sin(\phi) \end{cases}$$

Where $\phi$ denotes the angle formed by the line connecting the vehicle and the obstacle with the x-axis of the global coordinates;

Thus, the longitudinal risk $R_x$, the lateral risk $R_y$ and the total driving risk $R_{risk}$ of the predicted trajectory with a control step $N_c$ are obtained:

$$\begin{cases} R_x = \dfrac{\sum_{k=1}^{N_c} F_{Rx}(X_{pred}^k, Y_{pred}^k)}{N_c} \\ R_y = \dfrac{\sum_{k=1}^{N_c} F_{Ry}(X_{pred}^k, Y_{pred}^k)}{N_c} \end{cases}$$

$$R_{risk} = R_x + R_y$$

In step S5, realizing the switching of control between the automatic system and the driver based on the driving risk: performing the driving risk assessment of the predicted trajectory in step S4 to obtain a driving risk $R_{risk}$, given a threshold of the driver's driving risk $R_{risk}*$, switching the control of the vehicle to the automatic system when the driving risk be equal or greater than the risk threshold (i.e. $R_{risk} \geq R_{risk}*$); and switching the control of the vehicle to the human driver when the driving risk is less than the risk threshold (i.e. $R_{risk} < R_{risk}*$).

The present embodiment predicts the trajectory by designing a path tracking controller, and then determines whether the vehicle is actually controlled by the driver or by the automatic system by predicting the driver's driving risk when there is a driving input from the driver, this embodiment ensures that when the driving input from the driver will cause a higher risk to the vehicle, the driving input from the driver is deprived, and the automatic driving is carried out entirely by the automatic system, and in the event that the driver's driving inputs do not pose a high risk to the vehicle, and the driving is carried out by the driver so that the driver can effectively realize safe interventions when the automatic driving has a problem, and the safety of the intelligent driving is improved. Moreover, this embodiment adopts the method of artificial potential field, comprehensively considers the lateral and longitudinal risk of the vehicle, and improves the accuracy of the driving risk assessment.

Embodiment 3

This embodiment is disclosed based on Embodiment 2:

The vehicle parameters are set as follows: vehicle's mass m=1575, rotational inertia $I_z$=2875, distance from center of mass to front axle $l_f$=1.2, distance from center of mass to rear axle $l_r$=1.6, cornering stiffness of front wheels $c_f$=19000, cornering stiffness of rear wheels $c_r$=33000, output weight matrix $Q = I_{(N_p \times N_p)} \otimes diag(100,100)$, control weight matrix $R = 5 \cdot I_{(N_c \times N_c)}$, (where $I_{(N \times N)}$ denotes the unit matrix of dimension N×N and the symbol $\otimes$ denotes the Kronecker product). The initial coordinates of the vehicle are X=0 and Y=0, the coordinates of the static obstacle are $X_{ob}$=50 and $Y_{ob}$=0.1, the parameter in the risk assessment is taken as Z=1000, $G_0$=100, the risk threshold is taken ask $R_{risk}*$=0.8, and the limit constraints and the increment constraints in the objective function are taken as:

$$u_{min} = -0.78, u_{max} = 0.78, \Delta u_{min} = -0.0082, \Delta u_{max} = 0.0082$$

Applied to the scenario of lane change to the left with a duration of 60 s, sampling time 0.05 s, prediction step $N_p$=6, and control step $N_c$=3, we obtain the graphs of driver's driving risk assessment, the graphs of steering angle from the driver and the automated system, and the graphs of vehicle steering angle based on the human-machine shared control strategy as shown in figures 1. 2, 3, and 4.

The present embodiment predicts the trajectory by designing a path tracking controller, and then determines whether the vehicle is actually controlled by the driver or by the automated system by predicting the driving risk of the trajectory when there is a driving input from the driver. This embodiment ensures that when the driving input from the driver will cause a higher risk to the vehicle, the driving input from the driver is deprived, and the automated driving is carried out entirely by the automated system, and ensures that when the driver's driving input do not pose a high risk to the vehicle, and the driving is carried out by the driver, so that the driver can effectively realize safe interventions when the automatic driving has a problem, and the safety of the intelligent driving is improved. Moreover, this embodiment adopts the method of artificial potential field, comprehensively considers the lateral and longitudinal risk of the vehicle, and improves the accuracy of the driving risk assessment.

In summary, embodiments of the present invention provide a human-machine shared control method based on trajectory prediction. This includes: establishing a road-vehicle model based on vehicle-related parameters; designing a path-tracking controller based on the road-vehicle model; predicting a driving trajectory based on the path-tracking controller; performing a driving risk assessment of the predicted trajectory; and finally realizing switching of control between the automation system and the human driver based on the driving risk. It ensures that when the driver's own driving inputs will cause high risk to the vehicle, the driver's own driving inputs are deprived of, and the vehicle is completely carried out by the automatic driving, and in the case that the driver's own driving inputs will not cause high risk to the vehicle, the vehicle is carried out by the driver, so that the driver can effectively realize the safe intervention, and the safety of the intelligent driving is improved.

Obviously, the above embodiments of the present invention are merely embodiments for the purpose of clearly illustrating the present invention, and are not intended to be a limitation of the embodiments of the present invention. For those of ordinary skill in the professional filed, other variations or changes in different forms may be made on the basis of the above description. It is neither necessary nor possible to exhaust all the embodiments herein. Any modifications, equivalent substitutions and improvements made within the spirit and principles of the present invention shall be included in the scope of protection of the claims of the present invention.

The invention claimed is:

1. A method for human-machine shared control based on trajectory prediction, characterized in that it comprises the following steps:
   S1: establishing a road-vehicle model according to vehicle-related parameters;
   S2: designing a path tracking controller according to the road-vehicle model: first, establishing a vehicle dynamics model and a vehicle kinematics model according to the vehicle-related parameters, and then establishing the road-vehicle model according to the vehicle dynamics model and the vehicle kinematics model;
   wherein according to the vehicle dynamics model and the vehicle kinematics model, the road-vehicle model is obtained as follows:

$\dot{x}(t)=Ax(t)+Bu(t)\pm B_\omega\omega(t)$ wherein $$x(t) = [v_y, r, \phi, e_d, e_\phi, X, Y]^T, u(t) = \delta(t). \ \omega(t) = [\rho, v_x]^T$$

$$A = \begin{bmatrix} \frac{-2(C_f+C_r)}{mv_x} & \frac{2(l_rC_r-l_fC_f)}{mv_x} & 0 & 0 & 0 & 0 & 0 \\ \frac{2(l_rC_r-l_fC_f)}{I_zv_x} & \frac{-2(l_f^2C_f-l_r^2C_r)}{I_zv_x} & 0 & 0 & 0 & 0 & 0 \\ 0 & 1 & 0 & 0 & 0 & 0 & 0 \\ 1 & 0 & 0 & 0 & v_x & 0 & 0 \\ 0 & 1 & 0 & 0 & 0 & 0 & 0 \\ -\phi & 0 & 0 & 0 & 0 & 0 & 0 \\ 1 & 0 & v_x & 0 & 0 & 0 & 0 \end{bmatrix},$$

$$B = \begin{bmatrix} \frac{2C_f}{m} \\ \frac{2l_fC_f}{m} \\ 0 \\ 0 \\ 0 \\ 0 \\ 0 \end{bmatrix}, B_\omega = \begin{bmatrix} 0 & 0 \\ 0 & 0 \\ 0 & 0 \\ 0 & 0 \\ v_x & 0 \\ 0 & 1 \\ 0 & 0 \end{bmatrix}$$

wherein T is used as sampling time and Euler's method is utilized:

$$\dot{x}(t) = \frac{x(k+1)-x(k)}{T}$$

converting a continuous vehicle model into a discrete vehicle model:

$\xi(k+1)=\tilde{A}\xi(k)+\tilde{B}u(k)+\tilde{B}_\omega\omega(k)$ wherein $\overline{A}=AT+I, \overline{B}=BT, \overline{B}_\omega=B_\omega T$, I denotes a unit matrix of corresponding dimensions;

wherein a prediction step of the path tracking controller is $N_p$ a control step is $N_c$, system measurements at each moment x(t) is used as a starting point of a prediction sequence x(0|t) to carry out optimization calculations, an optimal sequence of controlled variables is u*(k|t), $k \in [0,N_p-1]$ and a corresponding state sequences x*(k|t), $k \in [1,N_p]$ is obtained within prediction time domain $[t,t+N_p]$ and a first value of an optimal control sequence u*(0|t) is used as a control input at a current moment for acting on the vehicle;

wherein the path tracking controller based on a model predictive control method is designed with an objective function:

$\min J(x(k),u(k),\omega(k))=\min(Y^TQY+\Delta U^TR\Delta U)$ $s.t. \ \xi(k+1)=\tilde{A}\xi(k)+\tilde{B}u(k)+\tilde{B}_\omega\omega(k)$ wherein, $\xi(k+1)=\tilde{A}\xi(k)+\tilde{B}u(k)+\tilde{B}_\omega\omega(k)$ is the road-vehicle model, a predicted output of the system $Y=[y(k+1), y(k+2), \ldots, y(k+N_p)]^T$, Q denotes an output weight matrix, a control increment sequence $\Delta U=[\Delta u(k),\Delta u(k+1), \ldots, \Delta u(k+N_c-1)]^T$, R denotes a control weight matrix, and in addition for achieving a goal of path tracking, an output equation is taken as $$y = \begin{bmatrix} e_d \\ e_\phi \end{bmatrix};$$

considering limit constraints and increment constraints of controlled variables:

$u_{min}(t+k) \leq u(t+k) \leq u_{max}(t+k)$ $\Delta u_{min}(t+k) \leq \Delta u(t+k) \leq \Delta u_{max}(t+k)$ $k=0,1,\ldots,N_c-1$ S3: predicting driving trajectories based on the path tracking controller;
   S4: evaluating driving risk of predicted driving trajectories;
   S5: performing a switching of control between an automatic system and a driver based on the driving risk.

2. The method for human-machine shared control based on trajectory prediction according to claim 1, characterized in that the vehicle-related parameters comprise intrinsic parameters and implementation parameters of the vehicle in step S1;
   wherein the intrinsic parameters include: mass in, longitudinal velocity $v_y$, sampling time T, rotational inertia $l_z$, distance from center of mass to front axle $l_f$, distance from center of mass to rear axle $l_r$, cornering stiffness of front wheels $c_f$, cornering stiffness of rear wheels $c_r$, position coordinates of static obstacles $(X_{ob}, Y_{ob})$, minimum steering of the vehicle $\delta_{min}$, maximum steering of the vehicle $\delta_{max}$, minimum steering increment of the vehicle $\Delta\delta_{min}$, maximum steering increment of the vehicle $\Delta\delta_{max}$, parameter of a shortest distance between the vehicle and an obstacle Z, safety distance threshold parameter between the vehicle and an obstacle $G_0$;

the implementation parameters comprise: position coordinates of the vehicle (X, Y), lateral velocity $v_y$, heading angle $\phi$ and angular velocity r.

3. The method for human-machine shared control based on trajectory prediction according to claim 1, wherein the step of establishing the vehicle dynamics model based on vehicle-related parameters comprises:

setting a longitudinal velocity $v_x$ of the vehicle to be independently controlled and constant, and a lateral force of the vehicle is expressed as:

$$F_{xf} \cos \delta - F_{xf} \sin \delta + F_{yr} = m(\dot{v}_y + v_x r)$$

wherein $\delta$ is a front wheel steering angle of the vehicle, $v_x$ and $v_y$ are longitudinal and lateral velocities at a center of mass of the vehicle, r is a yaw rate of the vehicle, $F_{yr}$ and $F_{xr}$ are lateral and longitudinal forces on rear wheels of the vehicle, and $F_{xf}$ and $F_{xf}$ are lateral and longitudinal forces on front wheels of the vehicle;

under the condition that the vehicle is moving only in a two-dimensional plane without lateral slip and a vehicle's tire force is a linear model, a moment equations of the vehicle, a front and rear wheel slip angle ($\alpha_f$ and $\alpha_r$), and tire forces on the front and rear wheels ($F_{yf}$ and $F_{yr}$) is expressed as follows, respectively:

$$l_f(F_{yf}\cos\delta) - l_r(F_{yr} - F_{xf}\sin\delta) = I_z \dot{r}$$

$$\alpha_f = \tan^{-1}\left(\frac{v_y + l_f r}{v_x}\right) - \delta$$

$$\alpha_r = \tan^{-1}\left(\frac{v_y + l_r r}{v_x}\right)$$

$$F_{yf} = -c_f \alpha_f$$

$$F_{yr} = -c_r \alpha_r$$

wherein $l_f$ and $l_r$ are distances from the center of mass to centers of the front and rear wheels, $I_z$ is a moment of a vehicle's inertia around z axis, and $c_f$ as well as $c_r$ are a cornering stiffnesses of the front and rear wheels, respectively, the vehicle dynamics model is obtained as follows:

$$\dot{v}_y = \frac{-c_f\left[\tan^{-1}\left(\frac{v_y + l_f r}{v_x}\right) - \delta\right]\cos\delta - c_r \tan^{-1}\left(\frac{v_y - l_r r}{v_x}\right)}{m} - v_x r$$

$$\dot{r} = \frac{-l_f c_f\left[\tan^{-1}\left(\frac{v_y + l_f r}{v_x}\right) - \delta\right]\cos\delta + l_r c_r \tan^{-1}\left(\frac{v_y - l_r r}{v_x}\right)}{I_z}$$

using angle approximation of trigonometric functions, a linearization is obtained:

$$\dot{v}_y = \frac{-(c_f + c_r)}{m v_x} v_y + \left[\frac{l_r c_r - l_f c_f}{m v_x} - v_x\right] r + \frac{c_f}{m} \delta$$

$$\dot{r} = \frac{l_r c_r - l_f c_f}{I_z v_x} v_y + \frac{-(l_f^2 c_f + l_r^2 c_r)}{I_z v_x} r + \frac{l_f c_f}{I_z} \delta$$

a two-wheeled model is transformed into a four-wheeled vehicle model, so a vehicle model is represented as:

$$\begin{bmatrix} \dot{v}_y \\ \dot{r} \end{bmatrix} = \begin{bmatrix} \frac{-2(c_f + c_r)}{m v_x} & \frac{2(l_r c_r - l_f c_f)}{m v_x} - v_x \\ \frac{2(l_r c_r - l_f c_f)}{I_z v_x} & \frac{-2(l_f^2 c_f + l_r^2 c_r)}{I_z v_x} \end{bmatrix} \begin{bmatrix} v_y \\ r \end{bmatrix} + \begin{bmatrix} \frac{2c_f}{m} \\ \frac{2l_f c_f}{m} \end{bmatrix} \delta$$

when the vehicle performs path tracking a lateral error $e_d$ and heading error $e_\phi$ is expressed b a following equation:

$$\dot{e}_d = v_x \sin(e_\phi) + v_y \cos(e_\phi)$$

$$\dot{e}_\phi = r - v_x \rho$$

wherein, $e_d$ is a lateral error between a center of a vehicle's mass and a reference trajectory, and $e_\phi$ is a heading error between the vehicle and the reference trajectory, and a small angle assumption (i.e., $\sin(e_\phi) \approx e_\phi$, $\cos(e_\phi) \approx 1$) is used for the heading error $e_\phi$, so a tracking error is simplified as:

$$\dot{e}_d = v_x e_\phi + v_y$$

$$\dot{e}_\phi = r - v_x \rho$$

the vehicle dynamics model is expressed as:

$$\begin{bmatrix} \dot{v}_y \\ \dot{r} \\ \dot{e}_d \\ \dot{e}_\phi \end{bmatrix} = \begin{bmatrix} \frac{-2(c_f + c_r)}{m v_x} & \frac{2(l_r c_r - l_f c_f)}{m v_x} & 0 & 0 \\ \frac{2(l_r c_r - l_f c_f)}{I_z v_x} & \frac{-2(l_f^2 c_f + l_r^2 c_r)}{I_z v_x} & 0 & 0 \\ 1 & 0 & 0 & v_x \\ 0 & 1 & 0 & 0 \end{bmatrix} \begin{bmatrix} v_y \\ r \\ e_d \\ e_\phi \end{bmatrix} + \begin{bmatrix} \frac{2c_f}{m} \\ \frac{2l_f c_f}{m} \\ 0 \\ 0 \end{bmatrix} \delta + \begin{bmatrix} 0 \\ 0 \\ 0 \\ -v_x \end{bmatrix} \rho$$

4. The method for human-machine shared control based on trajectory prediction according to claim 1, wherein the step of establishing the vehicle kinematic model based on vehicle-related parameters comprises:

according to kinematic characteristics of the vehicle, setting the kinematic model of the vehicle as follows:

$$\dot{X} = v_x \cos \phi - v_y \sin \phi$$

$$\dot{Y} = v_x \sin \phi + v_y \cos \phi$$

wherein the vehicle is in a driving condition with a small steering angle, the kinematic model is simplified as:

$$\dot{X} = v_x - v_y \phi$$

$$\dot{Y} = v_x \phi + v_y.$$

5. The method for human-machine shared control based on trajectory prediction according to claim 1, wherein in step S3, the step of predicting the driving trajectories according to the path tracking controller comprises:

$$\min J(x(k), u(k), \omega(k)) = \min(Y^T Q Y + \Delta U^T R \Delta U)$$ objective function:

$$s.t. \ \xi(k+1) = \tilde{A}\xi(k) + \tilde{B}u(k) + \tilde{B}_\omega \omega(k)$$

$$u_{min}(t+k) \leq u(t+k) \leq u_{max}(t+k)$$

$$\Delta u_{min}(t+k) \leq \Delta u(t+k) \leq \Delta u_{max}(t+k)$$

$$k = 0, 1, \ldots, N_c - 1$$ constraints:

by solving a quadratic programming problem, obtaining the optimal control sequence to achieve target tracking:

$$U=[u(k),u(k+1),\ldots,u(k+N_c-1)]$$

calculating a predicted sequence of system states $\Xi$ by utilizing both a state equation of the system and the optimal control sequence:

$$\Xi=\Gamma x(k)+\gamma U+\Pi\Omega$$

wherein $$\Xi = \begin{bmatrix} x(k+1) \\ x(k+2) \\ \vdots \\ x(k+N_c) \end{bmatrix}, U = \begin{bmatrix} u(k) \\ u(k+1) \\ \vdots \\ u(k+N_c-1) \end{bmatrix}, \Omega = \begin{bmatrix} \omega(k) \\ \omega(k+1) \\ \vdots \\ \omega(k+N_c-1) \end{bmatrix}, \Gamma = \begin{bmatrix} \tilde{A} \\ \tilde{A}^2 \\ \vdots \\ \tilde{A}^{N_c} \end{bmatrix},$$

$$\Upsilon = \begin{bmatrix} \tilde{B} & 0 & \cdots & 0 \\ \tilde{A}\tilde{B} & \tilde{B} & \cdots & 0 \\ \vdots & \vdots & \ddots & \vdots \\ \tilde{A}^{(N_c-1)}\tilde{B} & \tilde{A}^{(N_c-2)}\tilde{B} & \cdots & \tilde{B} \end{bmatrix}, \Pi = \begin{bmatrix} \tilde{B}_\omega & 0 & \cdots & 0 \\ \tilde{A}\tilde{B}_\omega & \tilde{B}_\omega & \cdots & 0 \\ \vdots & \vdots & \ddots & \vdots \\ \tilde{A}^{(N_c-1)}\tilde{B}_\omega & \tilde{A}^{(N_c-2)}\tilde{B}_\omega & \cdots & \tilde{B}_\omega \end{bmatrix}$$

a predictive trajectory sequence of the driver is:

$$[(X_{k+1},Y_{k+1}),(X_{k+2},Y_{k+2}),\ldots,(X_{k+N},Y_{k+N_c})].$$

6. The method for human-machine shared control based on trajectory prediction according to claim 5, wherein the step of evaluating the driving risk of the predicted driving trajectories in step S4 comprises:

evaluating the driving risk based on a positional relationship between the driver and an obstacle-by using an artificial potential field approach, wherein a field strength of a barrier field is defined:

$$U_R(X) = \begin{cases} 0.5Z\left(\dfrac{1}{R_R} - \dfrac{1}{G_0}\right)^2, & R_R \le G_0 \\ 0, & R_R > G_0 \end{cases}$$

(X,Y) denotes a current position of the vehicle and $(X_{OB},Y_{OB})$ denotes a position of the obstacle, Z denotes a shortest distance coefficient between the vehicle and the obstacle, $G_0$ is used to characterize a safety distance threshold coefficient for the obstacle $R_R$ indicates a shortest distance between the vehicle and the obstacle $R_R=\sqrt{(X-X_{OB})^2+(Y-Y_{OB})^2}$; field force of a repulsive field $F_R$ formed around the obstacle is described by a negative gradient in the field strength $$F_R = -grad[U_R(X)] = \begin{cases} Z\left(\dfrac{1}{R_R} - \dfrac{1}{G_0}\right) \times \dfrac{1}{R_R^2}, & R_R \le G_0 \\ 0, & R_R > G_0 \end{cases}$$

the field force of the repulsive field is categorized into longitudinal field force $F_{Rx}$ and lateral field force $F_{Ry}$:

$$\begin{cases} F_{Rx} = F_R \cdot \cos(\phi) \\ F_{Ry} = F_R \cdot \sin(\phi) \end{cases}$$

wherein $\phi$ denotes an angle formed by a line connecting the vehicle and the obstacle with an x-axis of a global coordinates;

the predicted driving trajectory with a control step $N_c$ has a longitudinal risk $R_x$ and a lateral risk $R_y$ described by an average of the risks, and a total driving risk $R_{risk}$ is obtained:

$$\begin{cases} R_x = \dfrac{\sum_{k=1}^{N_c} F_{Rx}(X^k_{pred}, Y^k_{pred})}{N_c} \\ R_y = \dfrac{\sum_{k=1}^{N_c} F_{Ry}(X^k_{pred}, Y^k_{pred})}{N_c} \end{cases}$$

$$R_{risk} = R_x + R_y$$

7. The method for human-machine shared control based on trajectory prediction according to claim 6, wherein the step of performing the switching of control between the automatic system and the driver based on the driving risk in step S5 comprises:

performing a risk assessment of the predicted driving trajectory in step S4 to obtain a driving risk $R_{risk}$ giving a risk threshold of a driver's driving risk $R_{risk}$*, and switching the control of the vehicle to the automatic system when the driving risk is equal or greater than the risk threshold $R_{risk} \ge R_{risk}$*; switching the control of the vehicle to the driver when the driving risk be less than the risk threshold (i.e. $R_{risk} < R_{risk}$*).

\* \* \* \* \*